United States Patent [19]

Matsushita et al.

[11] Patent Number: 4,964,068
[45] Date of Patent: Oct. 16, 1990

[54] APPARATUS FOR DRAWING A CONDUCTOR PRINT PATTERN OF DEFOGGING HEATER WIRES ON A MOTOR VEHICLE WINDOW

[75] Inventors: Yoshimitsu Matsushita, Kawasaki; Katsuyoshi Ohme, Yokohama, both of Japan

[73] Assignee: Nippon Sheet Glass Co., Ltd., Osaka, Japan

[21] Appl. No.: 450,675

[22] Filed: Dec. 14, 1989

[30] Foreign Application Priority Data

Dec. 20, 1988 [JP] Japan .................................. 63-321169

[51] Int. Cl.[5] .............................................. G06F 15/00
[52] U.S. Cl. ....................................... 364/520; 364/900
[58] Field of Search ...... 364/520, 518, 921.3 MS File, 364/222 MS File; 65/DIG. 4, 58.1; 338/306

[56] References Cited

U.S. PATENT DOCUMENTS 4,668,270  5/1987  Ramus .................................. 219/543
4,800,510  1/1989  Vinberg et al. ...................... 364/520

Primary Examiner—Arthur G. Evans
Attorney, Agent, or Firm—Woodcock Washburn Kurtz Mackiewicz & Norris

[57] ABSTRACT

An automated drawing apparatus is disclosed, in which a dot string along a model line of defogging heater wires on a two-dimensional developed view of a glass window of a motor vehicle is digitized to generate functions of two-dimensional free curves corresponding to the heater wires, a width of each conductor of the heater wires is calculated on the basis of input data consisting of a heater resistance, a conductor length, sizes of heating areas, and calorific values of the respective areas, and a basic line of the heater wire is offset by the conductor width to generate conductor contours. Print patterns of heater wires are drawn automatically which eliminates precise manual drafting.

13 Claims, 7 Drawing Sheets

APPARATUS FOR DRAWING A CONDUCTOR PRINT PATTERN OF DEFOGGING HEATER WIRES ON A MOTOR VEHICLE WINDOW

BACKGROUND OF THE INVENTION

1. Field of the Invention

The present invention relates to an apparatus for drawing a conductor print pattern of defogging heater wires on a motor vehicle window.

2. Description of the Prior Art

Defogging heater wires on a motor vehicle glass window are formed by screen printing and sintering of conductive paste.

A known process is used for screen printing. Generally, a developed plan view (two-dimensional drawing) of a glass material is produced from a plan (trihedral views) of a glass window. A conductor pattern drawing is produced on the developed view on the basis of given specifications such as a conductor width and a distance between the conductors etc. of heater wires in a one-to-one size. A peeling film is cut along an outline of the conductor pattern to produce a cut mask in which conductor portion remains uncut. The cut mask is adhered to a screen on which a photosensitive material is applied. The resultant cut mask is exposed and washed with water to prepare a print screen in which a conductor portion corresponds to an opening. The screen overlaps the glass plate to print the conductive paste.

A width of each conductor is limited to be 1 mm or less so as not to interfere the field of view. In addition, the lengths of a large number of heater wires formed between bus bars are different from each other, so that the widths of the respective conductors are changed so as to equally set resistances of the wires. Furthermore, in order to differentiate a heating power (resistance) of a central portion (high-temperature area) from that of peripheral portions (low-temperature areas), conductor width of each heater wire must be modified in every heating area.

For this reason, drawing of a conductor pattern and preparation of a cut mask are performed by extremely sophisticated and precise manual operations. These operations are time-consuming even by a skilled person.

When various types of products are manufactured in small quantities, the above manual operations are obstacles for reducing cost and simplifying the manufacturing process.

SUMMARY OF THE INVENTION

It is an object of the present invention to manufacture a high-precision print screen within a short period of time without requiring highly advanced skills.

An apparatus according to this invention for drawing a conductor print pattern of defogging heater wires to be printed on a window glass of a motor vehicle comprises digitizing means for obtaining coordinate values of points on a model line of the defogging heater wires; function generation means for developing wire-fuctions of the heater wires on the basis of the coodinate values of the model line; length calculation means for calculating length along each wire between both ends thereof; width caculation means for calculating conductor width of each wire within respective heating areas comprising a high-heating area at a central portion of the window glass and a peripheral low-heating area, in accordance with input data consisting of resistances of respective heater wires; lengths of respective heater wires; lateral widths of respective heating areas; calorific values of the respective areas; resistivity of conductor material; and thicknesses of conductors in respective heating areas; contour generation means for generating curves corresponding to respective contours of the heater wires on the basis of data consisting of the wire-functions and the conductor widths; and means for drawing the print pattern of the heater wires on the basis of the conductor contours.

When the model line is digitized and various electrical and dimensional specifications of the heater wires are input, conductor contours can be automatically generated. A conductor pattern having a line width of 1 mm or less need not be manually drawn, and a high-precision print can be produced within a short period of time.

DESCRIPTION OF THE PREFERRED EMBODIMENT

Figure 1:
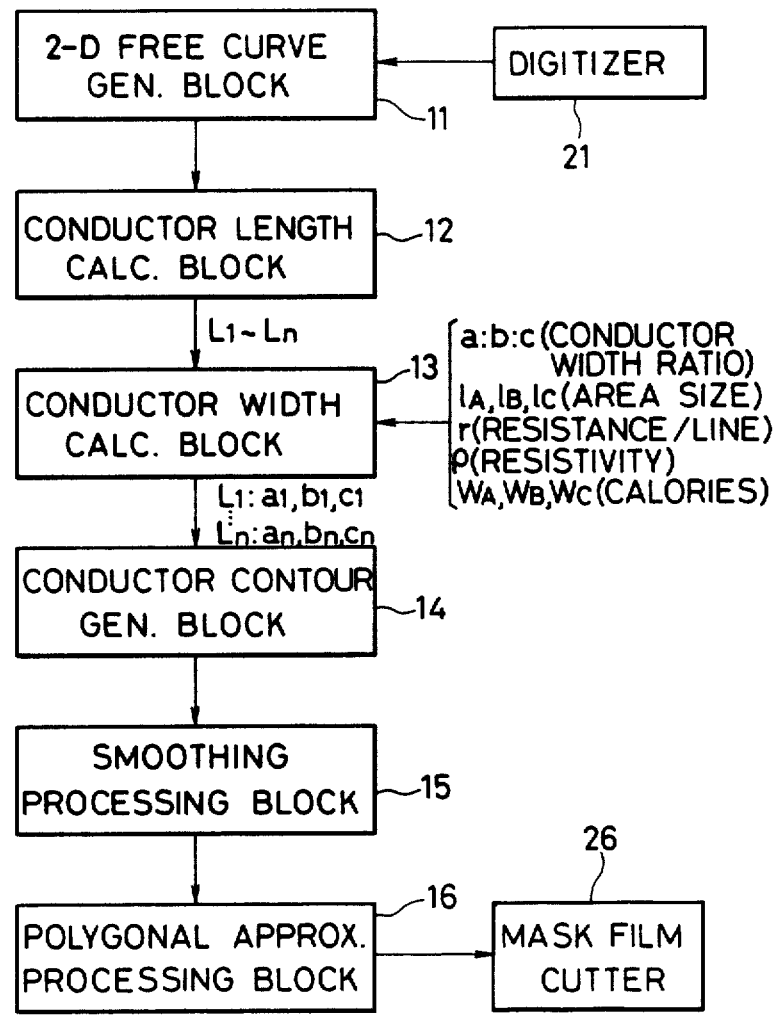
FIG. 1 is a schematic block diagram of a conductor print pattern drawing apparatus according to the present invention.
Figure 2:
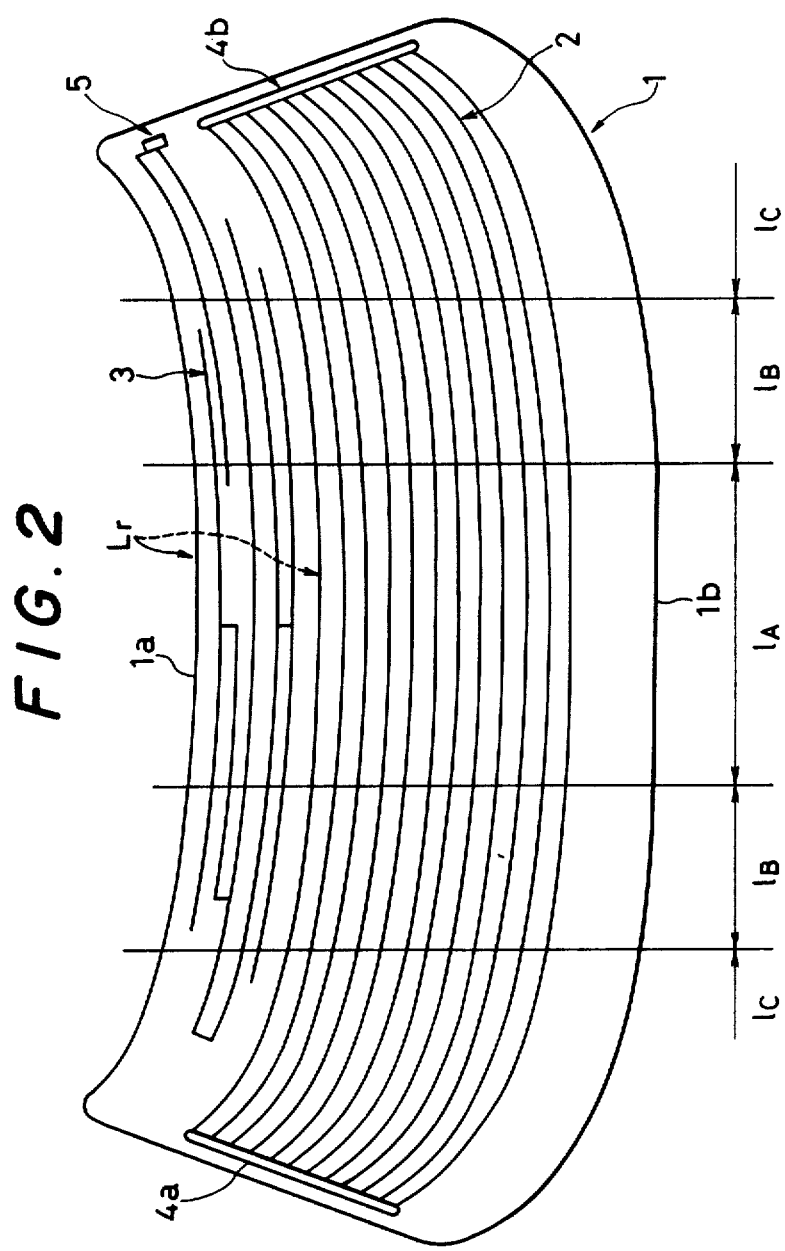
FIG. 2 is a view showing a conductor pattern of a glass window.

FIG. 1 is a block diagram of an automatic drawing system used to practice the present invention, and FIG. 2 shows conductor patterns of heater wires and antenna wires to be formed on a rear glass window of a motor vehicle.

FIG. 2 is a design drawing of a glass window (one plane of trihedral views), in which dimensions are written as to the respective parts of a glass window 1 and dimensions of essential parts of heater wires 2 and antenna wires 3 located above the heater wires 2. A plurality of parallel heater wires 2 are formed between a pair of bus bars 4a and 4b extending along both sides of the glass window 1. The antenna wires 3 are formed along the upper side of the window glass 1 in accordance with a pretuned conductive pattern. One end of the antenna wires is connected to a terminal 5 located at the corner of the glass window 1.

A heater area is divided into a central high-heating area A, intermediate-heating areas B at both sides of the high-heating area A, and low-heating areas C extending along bus bars 4a and 4b at both sides of the intermediate-heating areas B.

The following items are given as specifications of the heater wires 2 in the design drawing shown in FIG. 2:

a. total power consumption W (Watts)
b. power supply voltage V
c. number n of heater wires
d. interline pitch P of heater wires (meter)
e. maximum line width (1 mm or less)

f. lateral sizes $l_A$, $l_B$, and $l_C$ of the respective heating areas A, B, and C along curved surface g. heating powers $W_A$, $W_B$, and $W_C$ of the respective heating areas A, B, and C (W/m²)

Figure 3:
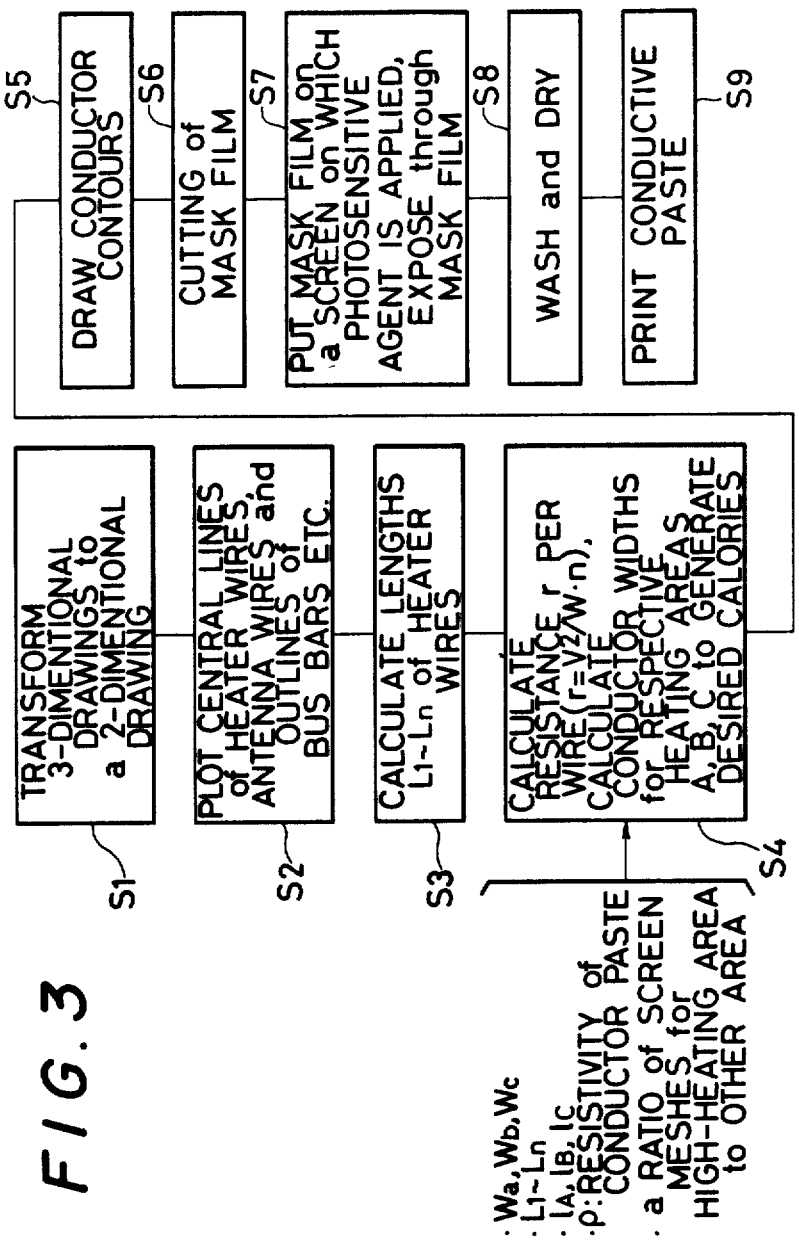
FIG. 3 is a flow chart showing a general process for producing a print screen.

FIG. 3 is a flow chart showing a general process for producing a print screen on the basis of given wiring specifications.

In step S1, a two-dimensional drawing (a developed flat view of the glass window) is prepared on the basis of trihedral drawings (FIG. 2). In step S2, central lines of the conductors of the heater wires 2 and the antenna wires 3 and outlines of the bus bars 4a and 4b and the terminal 5 are plotted on the two-dimensional drawing on the basis of size-designations in FIG. 2. In step S3, lengths $L_1$ to $L_n$ of the respective heater wires 2 are measured.

A resistance r per heater wire 2 is obtained as follows:

$$r = V^2/(W \cdot n) \quad (1)$$

where V is the power supply voltage, W is the total power consumption, and n is the number of conductors. In step 4, the conductor widths of each heater wire 2 for respective heating areas are calculated using factors consisting of the resistance r, the heating powers (calorific values) $W_A$, $W_B$ and $W_C$ of the high-, intermediate-, and low-heating areas, the heater wire lengths $L_1$ to $L_n$, widths $l_A$, $l_B$, and $l_C$ of the respective heating areas, a resistivity $\rho$ of the conductive paste, a screen mesh ratio (1:1.5) of the high-heating area to other areas.

Figures 4A, 4B:
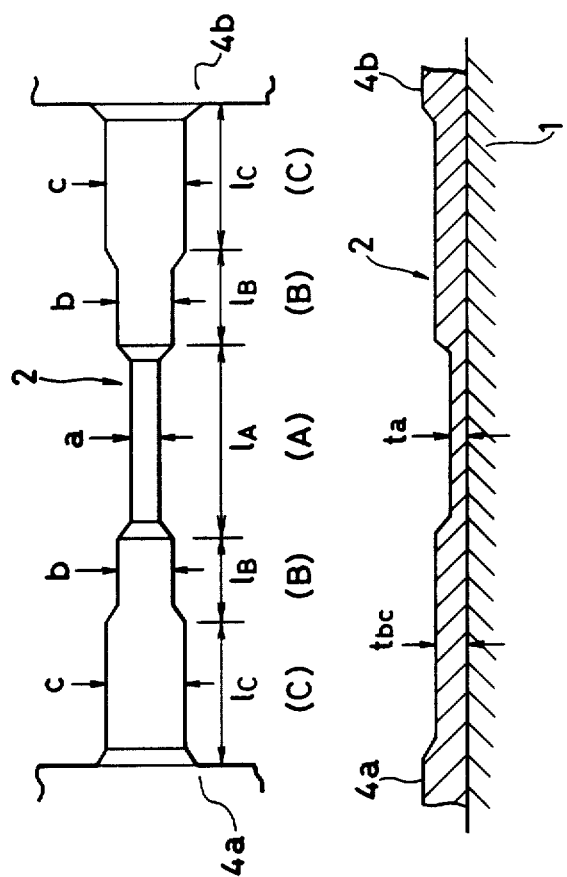
FIGS. 4A and 4B are a plan view and a sectional view, respectively, showing a heater conductor.

FIGS. 4(A) and 4(B) are a view showing an outer appearance of the heater wire 2 and its longitudinal sectional view thereof, respectively. The conductor widths a, b, and c of the high-, intermediate-, and low-heating areas A, B and C are increased in the order named, and a thickness $t_a$ of the high-heating area A is set to be smaller than a thickness $t_{bc}$ of the other areas B and C. Therefore, the heating powers $W_A$, $W_B$ and $W_C$ are set to comply with the specifications. The conductor thicknesses $t_a$ and $t_{bc}$ are fixed in accordance with a difference between the print screen mesh sizes of the high-heating area A and other areas, i.e., a difference between the amounts of conductive paste supplied to the high-heating area A and other areas. For example, a mesh size ratio is given to be 1:1.5, so that the thicknesses $t_a$ and $t_{bc}$ correspond to this ratio.

When the conductor thicknesses $t_a$ and $t_{bc}$ are determined, resistances $r_a$, $r_b$ and $r_c$ of the respective areas are determined by cross-sectional areas a $t_a$, b·$t_{bc}$, and c $t_{bc}$ of the respective areas, the conductor lengths $l_a$, $l_b$, and $l_c$ and the resistivity $\rho$ of the conductive paste. The conductor widths a, and b, and c which can satisfy the following conditions are calculated by the resistance r per heater wire 2 and the heating power $W_A$, $W_B$, and $W_C$ of the respective areas:

$$r = V^2/(W \cdot n) = r_a + r_b + r_c \quad (2)$$

$$r_a : r_b : r_c = W_a : W_b : W_c \quad (3)$$

The heating zone has a trapezoidal shape, so that the lengths $L_1$ to $L_n$ of the heater wires 2 are gradually increased toward a lower side lb of the glass window 1, as shown in FIG. 2. Of all other conductor lengths of each heating area, the length $l_C$ is changed in accordance with the lengths $L_1$ to $L_n$ ($l_A$ and $l_B$ are fixed). Therefore, the conductor widths c of each low-heating area C are different in all n heater wires 2 and must be calculated for respective heater wires.

In step S5, the conductor contours of the heater and antenna wires 2 and 3 are drawn on the basis of the conductor widths a to c determined in step S4 of FIG. 3. The antenna wires 3 each having a width of, e.g., 0.7 mm in compliance with the design specifications are drawn. In step S6, a mask film is cut. In Step S7, a photosensitive agent is applied to the pattern mask film on a print screen and the screen is exposed through the mask pattern. In step S8, the screen is washed with water and dried to obtain a print screen. By using the resultant screen, a conductive paste is printed on a sheet glass (step S9).

The operations in steps S2 to S6 of the steps shown in FIG. 3 are automated without manual operations according to the object of the present invention. The fundamental principle of operation of the present invention will be described with reference to a schematic block diagram of FIG. 1. The automatic drawing system shown in FIG. 1 is practically realized by a general-purpose CAD system shown in FIG. 5.

Figure 5:
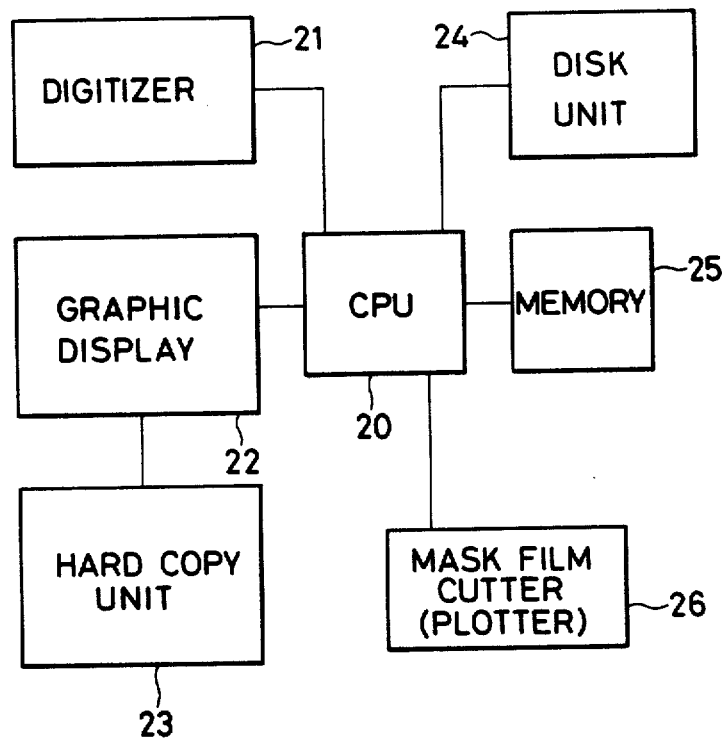
FIG. 5 is a block diagram of a CAD system.

Referring to FIG. 5, a CPU 5 as a major component is connected to a digitizer 21, a graphic display 22, a hard copy unit 23, a disk unit 24, a memory 25, and an X-Y plotter 26 (a mask film cutter is arranged in this system) to constitute a two-dimensional CAD system.

Referring to FIG. 1, a two-dimensional free curve generation block 11 for generating the central line of the conductor, a conductor length calculation block 12, a conductor width calculation block 13, a conductor contour generation block 14, a smoothing processing block 15, and a polygonal approximation processing block 16 are actually realized by software programmed in the system of FIG. 5.

The two-dimensional free curve generation block 11 in FIG. 1 generates each two-dimensional free curve (e.g., a spline curve) as a basic line e.g., a central line of a conductor on the basis of input data from the digitizer 21. The operation of this block is shown in a flow chart of FIG. 6. In step S10, X- and Y-coordinates of a dot string on the two-dimensional outline of the glass window 1 are input from the digitizer 21. In step S11, a two-dimensional spline curve which passes through the fetched dot string is generated, so that the outline of the glass window 1 is displayed on the graphic display 22. In step S12, the bus bars 4a and 4b, and the terminal 5 of the antenna wires are drawn according to sizes designated on the three-dimensional curves in FIG. 2. This drawing operation is performed using the digitizer 21 and the graphic display 22 shown in FIG. 5. The sizes designated in FIG. 2 are given as those from a glass edge along the curved surface of the glass.

In step S13, by using an upper side 1a (or the lower side 1b) of the glass window 1 as a reference line (model line) $L_r$, spline curves of the central lines of the conductors of the heater and antenna wires 2 and 3 are produced by offsetting with respect to the reference line $L_r$. As shown in FIG. 2, the central line of the uppermost reference heater line 2 may be used as the reference line $L_r$. In this case, the uppermost reference heater wire 2 must be written in the developed view of the glass window 1 beforehand.

An offset amount in step S13 is designated on the design drawing (FIG. 2) as an interline pitch P along the curved surface. An offset amount for the heater wires 2 is an integer multiple (nP; n=1, 2, ...) of the interline pitch P from the uppermost reference heater wire. The offset amount is input from a keyboard (not shown). If a spline curve produced by offsetting is shorter than that of a desired heater wire, a spline curve having the same curvature as that of the desired spline curve is interpolated midway at an intermediate portion (high-heating area) which includes almost straight lines.

Figure 6:
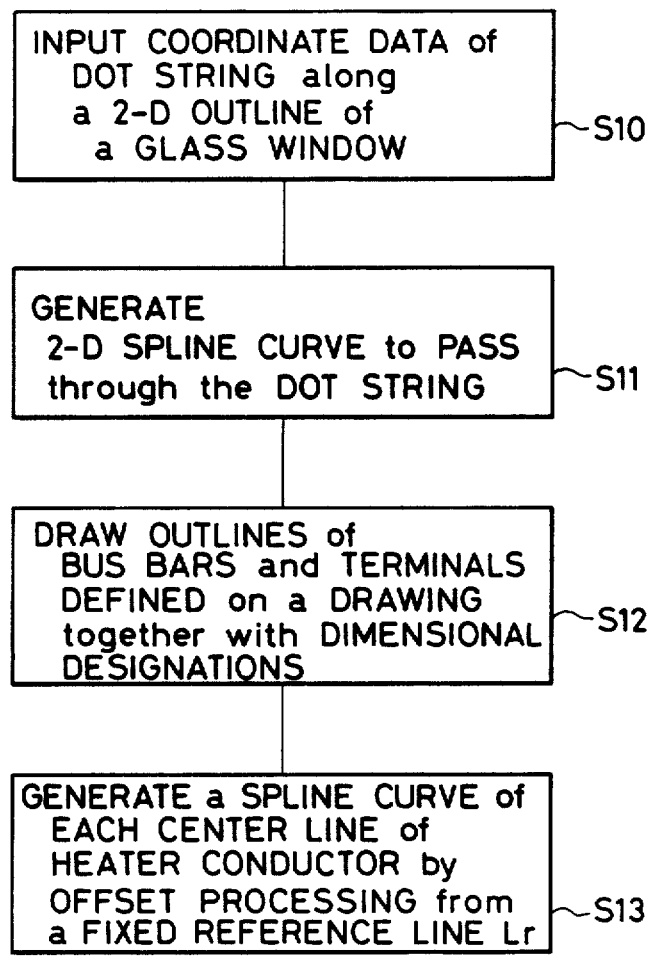
FIG. 6 is a flow chart showing processing of a two-dimensional free curve generation block in FIG. 1.

Production of the central lines of the conductors is completed by steps S10 to S13 in FIG. 6 in the two-dimensional free curve generation block 11 of FIG. 1. However, instead of offsetting, the central lines of all conductors of the heater and antenna wires 2 and 3 may be drawn by hand on the developed view of the glass window, and the dot string data of all the central lines may be input with the digitizer 21 to obtain the corresponding spline curves.

Referring to FIG. 1, the conductor length calculation block 12 calculates the conductor lengths $L_1, L_2, \ldots L_n$ of the n heater wires 2 between the bus bars 4a and 4b. The calculations of the conductor lengths are performed using a program stored in the general-purpose CAD system.

Data of the conductor lengths $L_1, L_2, \ldots L_n$ are supplied to the conductor width calculation block 13. The calculation block 13 also receives other data of the resistance r per heter wire 2 which is represented by equation (1), the resistivity $\rho$ of the conductive paste to be printed, the lateral widths $l_A$, $l_B$, and $l_C$ of the respective areas, and the heating powers $W_A$, $W_B$, and $W_C$ of the respective areas. In the case of FIG. 2, the widths $l_A$ and $l_B$ of the high- and intermediate-heating areas A and B are fixed values as 400 mm and 200 mm (the total width of both the intermediate-heating areas B is 400 mm), respectively. In respective heating areas A and B, conductors are almost straight and conductor lengths $l_a$ and $l_b$ in the areas are nearly equal to the widths $l_A$ and $l_B$. Therefore, the width $2l_c$ of the low-heating area C is given as $L_n - 800$ (n = 1, 2, ...).

A conductor width ratio of a : b : c of the high-, intermediate- and low-heating areas is supplied to to the conductor width calculation block 13 as reference data from a data table in the memory 25 shown in FIG. 5. This ratio is associated with typical various values (or their ratio) of the heating powers $W_A$, $W_B$, and $W_C$ of the respective areas and is calculated beforehand in consideration of a screen mesh ratio (1:1.5) of the high-heating area to other areas. The conductor width ratio can be properly corrected to correspond to an actual finished product and is stored in the memory 25. For example, if the heating amount ratio of $W_A:W_B:W_C$ is given as 1.3:1:0.8, the conductor width ratio of a:b:c is read out as 0.7:0.8:1.

The conductor width calculation block 13 sequentially calculates conductor widths $(a_1,b_1,c_c)$, $(a_2,b_2,c_2)$, ... $(a_n,b_n,c_n)$ of the respective heating areas A, B, and C of the respective heating areas A, B, and C of the respective heater wires 2. The basic algorithm of the conductor width calculation block 13 is given as follows:

$$r = V^2/(W \cdot n) = r_a + r_b + r_c \quad (2)$$

$$r_a = \rho(l_a/A_a), \ r_b = \rho(l_b/A_b), \ r_c = \rho(l_c/A_c) \quad (4)$$

$$r_a \cdot r_b \cdot r_c = W_a \cdot W_b W_c \quad (3)$$

where $A_a$, $A_b$, and $A_c$ are the cross-sectional areas of the conductor in the respective heating areas.

The cross-sectional areas are:

$$A_a = at_a, \ A_b = bt_{bc}, \ A_c = ct_{bc} \quad (5)$$

The conductor widths a, b and c can be solved by the equations (2)-(5).

$$a = \frac{\rho l_a}{t_a r}\left(1 + \frac{W_c}{W_a} + \frac{W_c}{W_b}\right) \quad (6)$$

$$b = \frac{\rho l_b}{t_{bc} r}\left(1 + \frac{W_b}{W_c} + \frac{W_b}{W_a}\right) \quad (7)$$

$$c = \frac{\rho l_c}{t_{bc} r}\left(1 + \frac{W_a}{W_b} + \frac{W_a}{W_c}\right) \quad (8)$$

When the conductor thicknesses $t_a$ and $t_{bc}$ are given, widths a, b, c are calculated from equations (6)-(8).

For given data of $t_a$ and $t_{bc}$, a ratio a:b:c is then calculated. If the ratio roughly statifies the practical ratio e.g. 0.7:0.8:1 which is provided as a standard value, thicknesses $t_a$ and $t_{bc}$ are fixed as design data. If the ratio a:b:c is far from the practical value, it causes problems that a part of the conductor is too wide to keep the field of view of window or a part of conductor is too fine to be printed on the glass. To avoid these problems, calculations of the equations (6)-(8) are repeated with another set of $t_a$ and $t_{bc}$ until resultants satisfy the requirement.

When a practical ratio a:b:c is obtained, conductor thicknesses $t_a$ and $t_{bc}$ are fixed. The thicknesses can be controlled by a mesh size of a print screen and a thickness of photo-sensitive resist layer applied thereon.

A set of practical data of the conductor widths a, b and c are thus generated. For an example shown in FIG. 2, $a_1 = a_2 = \ldots a_n$ an and $b_1 = b_2 = \ldots b_n$ are set, and $c_n$ is a value in proportion to the area width $(L_n - 800)$. That is, the lower heater wire 2 is located, the larger the value $L_n$ becomes. The conductor widths $c_n$ must be gradually increased to provide equal resistance to all of the heater wires 2.

Conductor widths can be calculated when resistances of the heater wires are not uniform.

$$W_n = \frac{V^2}{r_n} = W_a l_{an} P + W_b l_{bn} P + W_c l_{cn} P \quad (9)$$

where $r_n$ is a resistance of that one of wires, $W_a$, $W_b$ and $W_c$ are heating powers (calorific values) [Watt/m²] of respective heating areas, $l_{an}$, $l_{bn}$ and $l_{cn}$ are lengths of heater conductors and P is pitch of the wires [m].

A resistance of one of wires is therefore:

$$r_n = \frac{V^2}{W_a l_{an} P + W_b l_{bn} P + W_c l_{cn} P} \quad (10)$$

$$= r_{an} + r_{bn} + r_{cn}.$$

$$r_{an} = \rho \frac{l_{an}}{A_{an}}, \ r_{bn} = \rho \frac{l_{bn}}{A_{bn}}, \ r_{cn} = \rho \frac{l_{cn}}{A_{cn}} \quad (11)$$

The heating powers $W_a$, $W_b$ and $W_c$ are inversely proportional to the cross-sectional areas $A_{an}$, $A_{bn}$ and $A_{cn}$ of respective heating areas.

$$A_{an}:A_{bn}:A_{cn} = \frac{1}{W_a} : \frac{1}{W_b} : \frac{1}{W_c} \tag{12}$$

The cross-sectional areas are:

$$\begin{aligned} A_{an} = A_n l_a, A_{bn} &= B_n l_{bc}, A_{cn} = C_n l_{bc} \\ &= \frac{W_a}{W_b} A_{an}, = \frac{W_a}{W_c} A_{an} \\ &= \frac{W_a}{W_b} a_n l_a, = \frac{W_a}{W_c} a_n l_a \end{aligned} \tag{13}$$

Conductor width $A_n$ is given by substituting equations (13) for equations (11) and then substituting equations (11) for equation (10).

$$a_n = \frac{\rho}{r_n l_a} \left( l_{an} + \frac{W_b}{W_a} l_{bn} + \frac{W_c}{W_a} l_{cn} \right) \tag{14}$$

Conductor widths $b_n$ and $c_n$ are given through similar calculations.

$$b_n = \frac{\rho}{r_n l_{ac}} \left( \frac{W_a}{W_b} l_{an} + l_{bn} + \frac{W_b}{W_a} l_{cn} \right) \tag{15}$$

$$c_n = \frac{\rho}{r_n l_{bc}} \left( \frac{W_a}{W_c} l_{an} + \frac{W_b}{W_c} l_{bn} + l_{cn} \right) \tag{16}$$

The conductor width data $(a_1,b_1,c_1)$, $(a_2,b_2,c_2)$, ... calculated by the conductor width calculation block 13 are supplied to the conductor contour generation block 14. In this block, offset spline curves $\pm OL_a$, $\pm OL$hd b, and $\pm OL_c$ which are vertically offset by $\frac{1}{2}$ of the conductor widths a, b, and c of the respective heating areas A, B, and C from the central line (spline curve) CL generated by the two-dimensional free curve generation block 11 are generated. These curves serve as conductor contours of the heater wires 2.

The spline curves of the central lines of the antenna wires which are generated by the block 11 are offset by a predetermined conductor width (e.g., 0.7 mm) to obtain conductor contours for the antenna wires 3.

Figure 7:
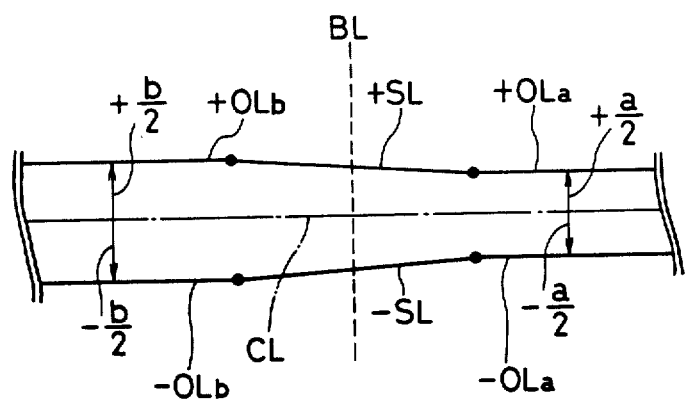
FIG. 7 is a detailed view of a conductor contour.

The smoothing block 15 generates gradually changing contours $\pm SL$ for smoothly connecting the stepped conductor contours in a fixed zone on both sides of the boundary lines BS of the respective heating areas, as shown in FIG. 7. These contours $\pm SL$ may be straight lines.

Figure 8:
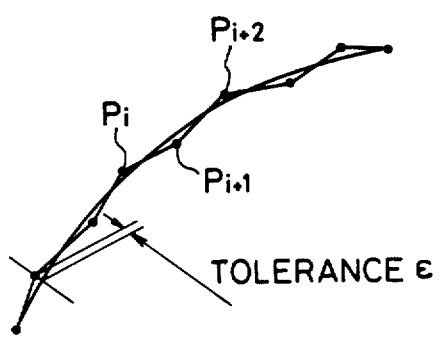
FIG. 8 is a view showing polygonal approximation of a spline curve.

The spline curves of the conductor contours of the heater wires 2, the antenna wires 3, the bus bars 4a and 4b, and the terminal 5 are subjected to polygonal approximation with a predetermined tolerance $\epsilon$ by the polygonal approximation processing block 16, as shown in FIG. 8. By this approximation, each spline curve is divided into straight lines which connect dots $P_i$, $P_{i+1}$, $P_{i+2}$, ... spaced apart from each other at small intervals. Each point $P_i$ is expressed by two-dimensional coordinates $(X_i, Y_i)$.

The dot string data $(x_i,y_i)$ obtained by the above polygonal approximation are supplied to the mask film cutter 26 in the order of generation. The mask film cutter 26 has a structure in which a cutting head is mounted on an X-Y plotter. The cutting head is sequentially moved to the input continous dot string data $(x_i,y_i)$ to cut the mask film (peeling film) into a shape corresponding to the conductor contours. Unnecessary film portions are removed to obtain a mask film. Fabrication of a print screen and printing of the conductive paste are performed in accordance with steps S7 to S9 in FIG. 3.

The printed conductive paste is sintered and its resistance is measured to detect a deviation from the design specifications. Composition of conductive particles such as silver particles mixed in the conductive paste can be adjusted to obtain a desired resistance, i.e., power consumption designated in the design specifications.

The above example directs to a both-end power supply type structure in which parallel heater wires 2 are arranged between the bus bars 4a and 4b. The heater wires 2 can be divided into upper and lower groups for another modified example. One ends of the upper and lower groups are commonly connected, and the other ends are respectively connected to bus bars, thereby supplying power through a turn-back path. The print screen may be prepared in the same manner as described above and can be applied to this structure. In this case, a resistance per heater wire is calculated as $(V/2)^2/(W n)$.

In the above embodiment, the two-dimensional developed view obtained from the trihedral views can be relatively easily obtained by patterning a sheet on a plate glass heating/bending mold formed on the basis of the trihedral views. However, unlike this method, the outer dimensions of the glass window on the trihedral views may be directly digitized to obtain a two-dimensional developed view by arithmetic operations in the CAD system.

In the above embodiment, the print screen mesh size of the high-heating ara A is different from that of other areas. However, a screen having an uniform mesh size may be used throughout the glass surface.

In the above embodiment, the two-dimensional free curve of the heater wire 2 is generated as the conductor basic lines at the center of the conductor. However, one of contours along the longitudinal direction of the conductor may be developed by a spline curve as the conductor basic line, while the other contour may be generated by offsetting by a conductor width.

According to the present invention, by only inputting small volume data on the basis of the heater wire specifications, a heater wire print pattern for heater wires having different conductor widths in respective heater wires and respective areas of different heating powers can be generated with high precision within a short period of time without requiring a skilled technique for drafting a screen printing pattern. Therefore, the present invention can immediately cope with differences in heater wire specifications for warm and cold districts. In particular, the present invention is very effect in a system for producing various types of products in small quantities. Furthermore, computer-aided pattern design can be performed to facilitate examinations of specifications prior to fabrication, design evaluation, and simulation, thereby providing optimal design.

What is claimed is:

1. An apparatus for drawing a conductor print pattern of defogging heater wires to be printed on a window glass of a motor vehicle comprising:

digitizing means for obtaining coodinate values of points on a model line of the defogging heater wires;

function generation means for developing wire-functions of said heater wires on the basis of said coodinate values of said model line;

length calculation means for calculating length along each wire between both ends thereof;

width calculation means for calculating conductor width of each wire within respective heating areas comprising a high-heating area at a central portion of the window glass and a peripheral low-heating area, in accordance with input data consisting of:

resistances of heater wires;

lengths of respective heater wires;

lateral widths of respective heating areas;

calorific values of the respective areas;

resistivity of conductor material; and thicknesses of conductors in respective heating areas;

contour generation means for generating contours of the heater wires, on the basis of data consisting of said wire-functions and said conductor widths; and means for drawing the print pattern of the heater wires on the basis of the conductor contours.

2. An apparatus according to claim 1, wherein said function generating means comprises means for developing functions of two-dimensional free curves of said heater wires on the basis of digitized data of a dot string along a model line of the heater wires.

3. An apparatus according to claim 2, wherein said two-dimensional free curve is a spline-curve.

4. An apparatus according to claim 1, wherein said function of the heater wire is a function of a straight line.

5. An apparatus according to claim 1, wherein said model line of the heater wires is one selected from heater wires and an outline of said window glass.

6. An apparatus according to claim 1, wherein said function generation means comprises replicating means which replicate a line defined by the developed wire-function to generate a plurality of heater wires at a regular interval on the window glass 7. An apparatus according to claim 1, wherein said functions of the heater wires represent respective outlines of said heater wires and said contour generating means generates contours of respective heater wires by an offset processing from the outlines by said conductor widths.

8. An apparatus according to claim 1, wherein said functions of the heater wires represets respective center lines of said heater wires and said contour generation means generates contours of respective heater wires by an offset processing from the center lines by $\frac{1}{2}$ of the conductor widths on both sides thereof.

9. An apparatus according to claim 1, wherein said means for calculating the conductor width data comprises a memory in which conductor width ratios of the respective areas for various calorific ratios of the respective heating areas are stored and from which stored data are read out as a practical standard of conductor width.

10. An apparatus according to claim 9, wherein the practical standard of conductor width ratios are prepared for different calorific ratios of the high-heating area to the peripheral area thereof and different mesh values of print screen assigned to respective areas.

11. An apparatus according to claim 1, wherein said drawing means comprises means for processing the conductor contour by polygonal approximation, and an X-Y plotter arranged as a mask film cutter which is controllable in accordance with polygonal point data generated by the polygonal approximation.

12. An apparatus according to claim 1, further comprising means for smoothing steps of the conductor contours at boundaries of the respective heating areas, the steps being formed due to different conductor widths.

13. An apparatus according to claim 1, wherein said heating areas comprises a high-heating area at a central portion of the window glass, intermediate-heating areas at both sides of the high-heating area and low-heating areas at both sides of the intermediate-heating areas.

* * * * *